Oct. 4, 1932.  H. E. ENSLIN  1,881,178
METHOD OF LACING SHOE UPPERS
Original Filed March 5, 1925   12 Sheets-Sheet 1

Witness
Frank A. Wright

Inventor
Herbert E. Enslin
by Van Everen Fish
Hildreth & Hay Attys.

Oct. 4, 1932.  H. E. ENSLIN  1,881,178
METHOD OF LACING SHOE UPPERS
Original Filed March 5, 1925   12 Sheets-Sheet 4

Witness
Jawright

Inventor
Herbert E. Enslin
by Van Everen Fish
Hildreth Heavy
Attys.

Oct. 4, 1932.    H. E. ENSLIN    1,881,178
METHOD OF LACING SHOE UPPERS
Original Filed March 5, 1925    12 Sheets-Sheet 5

Oct. 4, 1932.                    H. E. ENSLIN                   1,881,178
                          METHOD OF LACING SHOE UPPERS
                  Original Filed March 5, 1925    12 Sheets-Sheet 6

Oct. 4, 1932.  H. E. ENSLIN  1,881,178
METHOD OF LACING SHOE UPPERS
Original Filed March 5, 1925  12 Sheets-Sheet 8

Fig. 15

Witness
F. A. Wright

Inventor
Herbert E. Enslin
by Van Everen Fish
Hildreth & Cary Attys

Oct. 4, 1932.   H. E. ENSLIN   1,881,178
METHOD OF LACING SHOE UPPERS
Original Filed March 5, 1925   12 Sheets-Sheet 9

Oct. 4, 1932.  H. E. ENSLIN  1,881,178
METHOD OF LACING SHOE UPPERS
Original Filed March 5, 1925   12 Sheets-Sheet 10

Witness
F. A. Wright

Inventor
Herbert E. Enslin
by Van Everen Fish
Hildreth Neary
Attys

Oct. 4, 1932.                 H. E. ENSLIN                 1,881,178
METHOD OF LACING SHOE UPPERS
Original Filed March 5, 1925    12 Sheets-Sheet 11

Oct. 4, 1932.  H. E. ENSLIN  1,881,178
METHOD OF LACING SHOE UPPERS
Original Filed March 5, 1925    12 Sheets-Sheet 12

Patented Oct. 4, 1932

1,881,178

UNITED STATES PATENT OFFICE

HERBERT E. ENSLIN, OF BEVERLY, MASSACHUSETTS, ASSIGNOR TO UNITED SHOE MACHINERY CORPORATION, OF PATERSON, NEW JERSEY, A CORPORATION OF NEW JERSEY

METHOD OF LACING SHOE UPPERS

Original application filed March 5, 1925, Serial No. 13,299. Divided and this application filed May 15, 1930. Serial No. 452,629.

The invention relates to a method of lacing shoe uppers and is herein disclosed in connection with the machine for lacing shoe uppers described and claimed in the applicant's pending application Serial No. 13,299 filed March 5, 1925, of which the present application is a division.

In doing certain classes of work the upper should be so laced that when it is lasted the edges of the quarters will be held close together at the lower eyelets and will gradually separate above these eyelets. The method of the present invention provides for thus lacing the quarters and for accurately and uniformly limiting the separation at each pair of eyelets to insure the proper and desired relation between the edges of the quarters during the lasting. This is accomplished by connecting the different pairs of eyelets by separate or individual lacings, the lengths of which progressively increase from the bottom eyelets upward. Each pair of eyelets is thus connected by a lacing which is unaffected by or independent of the lacings connecting the other pairs of eyelets and which may be of the proper length to accurately secure the desired separation of the quarters at the pairs of eyelets.

While a gradually increasing separation of the quarters is required on some classes of work, there are other classes of work which require a uniform separation between the edges of the quarters and therefore between the different pairs of eyelets. The machine herein disclosed is designed to lace the uppers in accordance with the above method and is therefore so constructed that it may be adjusted to insert and form in a series of pairs of eyelets either a series of lacings of varying lengths or a series of lacings of equal lengths. To adapt the machine for doing a wide range of work, it is also adjustable for different spacings of eyelets and also to secure any length of lacing or degree of variation between adjacent lacings.

Small invisible eyelets are widely used in the manufacture of shoes, particularly of the higher grades, and the construction and mode of operation of the lace inserting devices are particularly adapted for inserting lacings in this type of eyelet. They include a hollow cord carrying spindle through which the cord is threaded, and from the end of which it projects into position to be engaged by the devices which cooperate with the spindle in inserting and tying the lacing. This form of spindle may be readily inserted and withdrawn from the eyelets and may readily be made of a size to enter the smallest eyelets used. The devices cooperating with the spindle act to draw therefrom the proper length of thread, sever it from the cord carried by the spindle and tie the ends together to form a lacing loop which connects a pair of eyelets.

To permit a plurality of lacings to be simultaneously inserted and tied, a number of lace inserting units corresponding to the number of pairs of eyelets in the series to be laced have been provided, each of which carries a cord carrying spindle and cooperating looping and knotting devices. The units are relatively adjustable laterally to vary the distance between adjacent spindles in accordance with the spacing of the eyelets in the work. The length of each lacing loop is determined by the position of the corresponding pair of eyelets with relation to the knotting devices at the time the ends of the lacing cord are tied together and the length of the different loops and the variation in the lengths of different loops is conveniently determined by varying the position of the work when the lacings are tied.

The invention will be further explained in connection with the machine shown in the accompanying drawings. In the drawings

In the form of the invention illustrated, the individual lacings which connect the series of pairs of eyelets are simultaneously inserted and consist of a series of cords each of which passes through a pair of eyelets and has its ends tied together to form a lacing loop connecting the eyelets.

The devices for thus connecting the eyelets by individual lacings comprise a series of cord carrying spindles 2 arranged to pass a series of cords through the eyelets as the upper is placed on the spindles by the operator; upper and lower gripper jaws 4 and 6 which grip the ends of the cords and draw the cords through the spindles and eyelets as the spindles withdraw from the eyelets; upper and lower gripper jaws 8 and 10 and knife 12 which grip and sever the cords on the inner side of the eyelets; a series of knotters 14, which tie the ends of the cords; a work holder 16 which positions the work after the spindles have withdrawn and during the knotting; and a measuring and stripping plate 18 over which the cords lead from the eyelets to the knotters.

Figure 7:
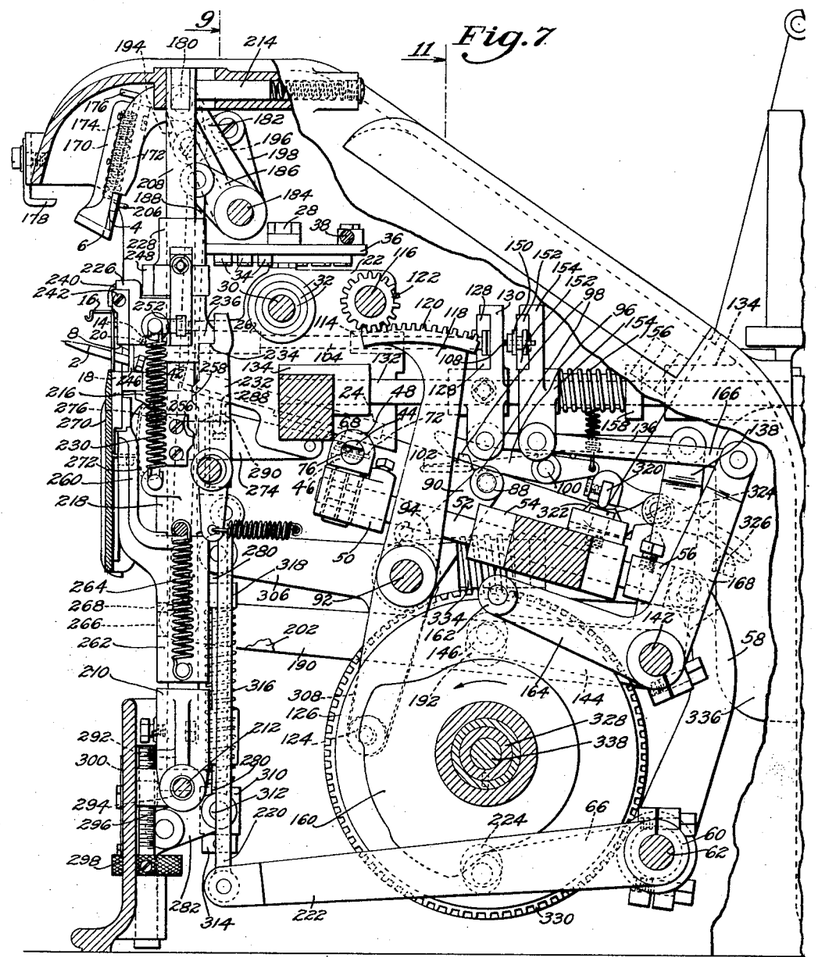
Fig. 7 is a right hand side elevation partly in section with parts of the casing broken away.
Figure 15:
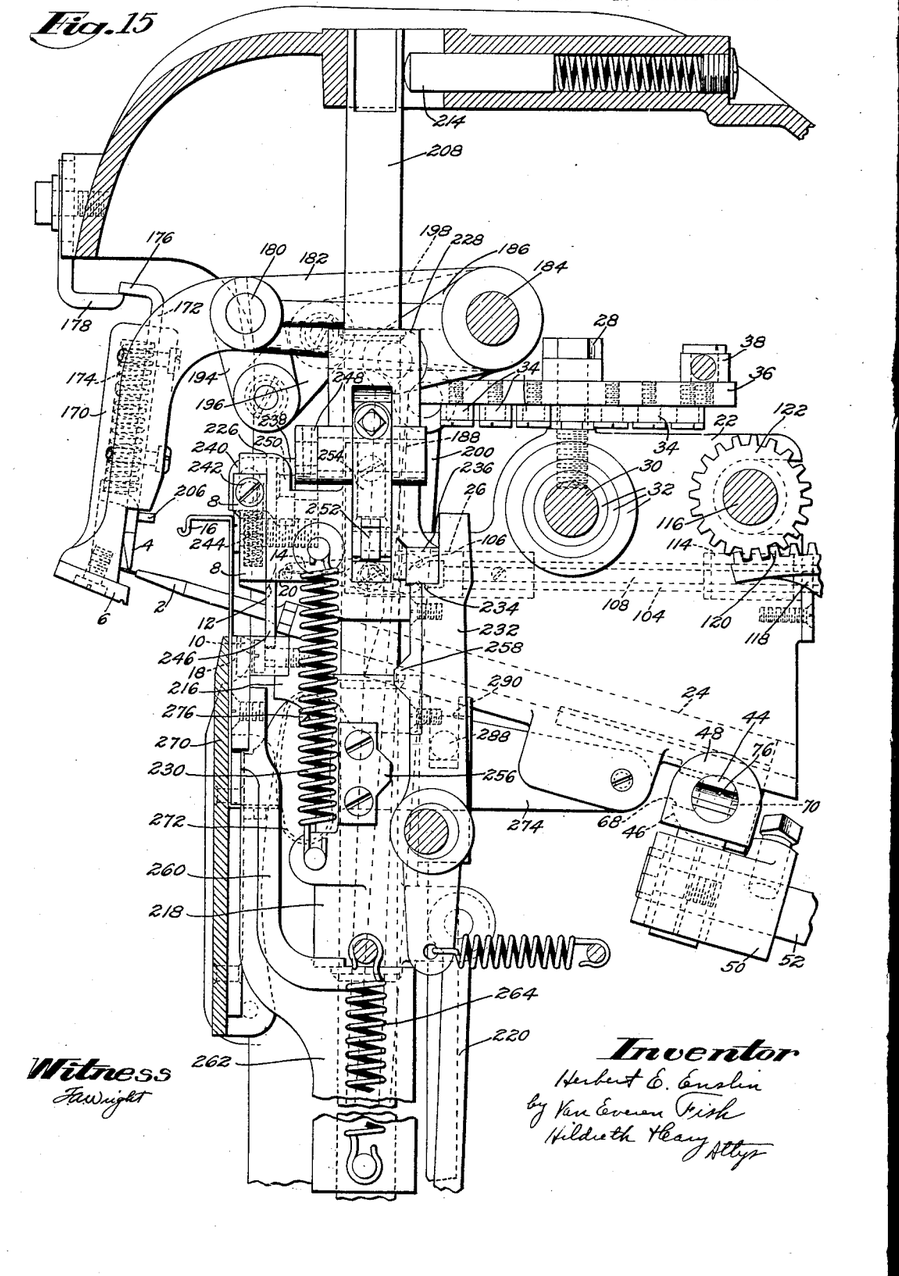
Fig. 15 is a partial side elevation partly in section.
Figure 17:
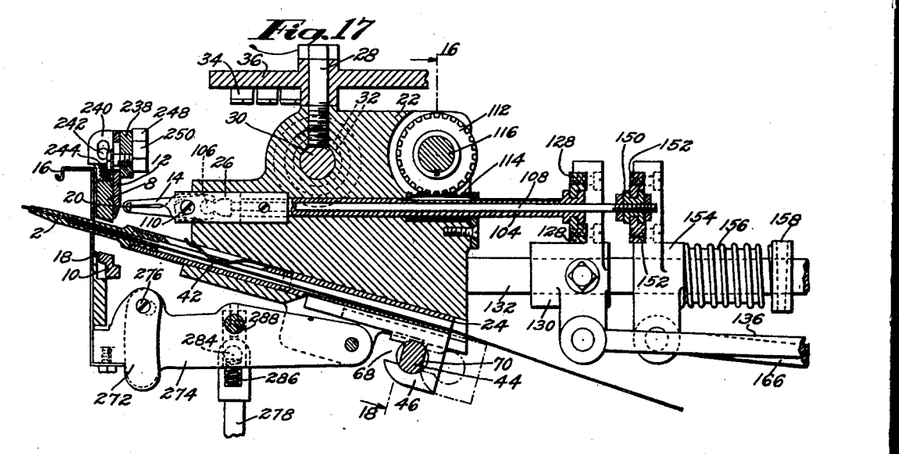
Fig. 17 is a detail sectional view through the block carrying the center cord spindle and knotter.
Figure 20:
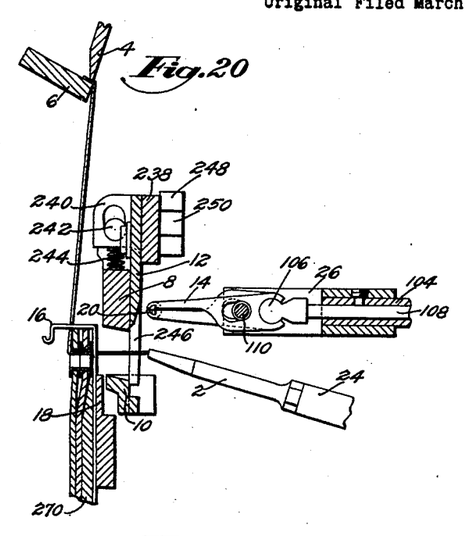
Figs. 20 to 33 are a series of diagrammatic views illustrating the mode of operation in inserting and forming the lacings.
Figure 25:
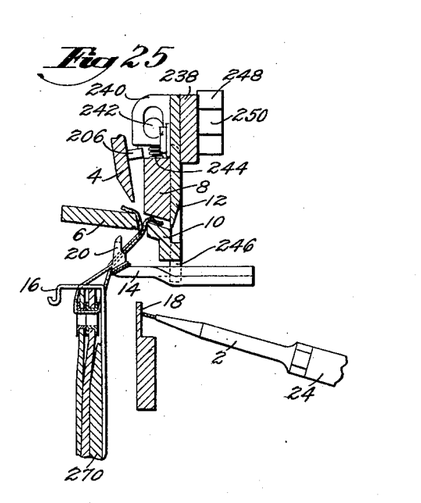
Figure 26:
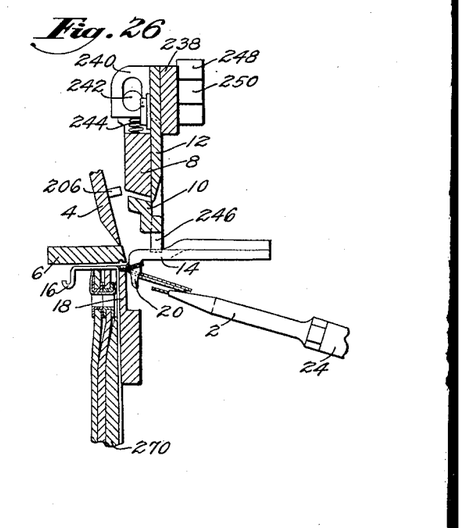
Figure 27:
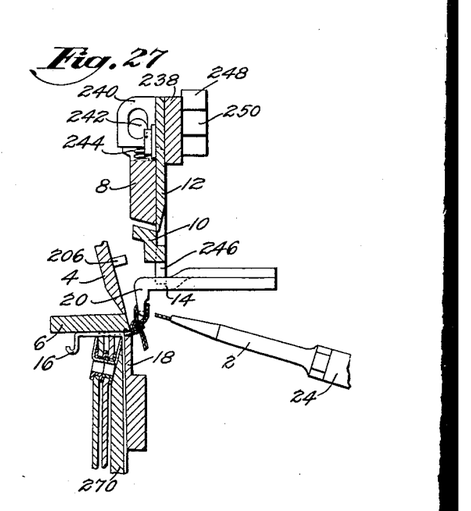
Figure 28:
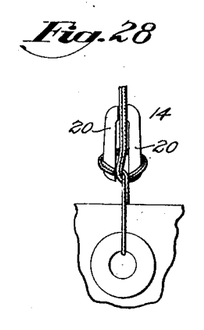
Figure 29:
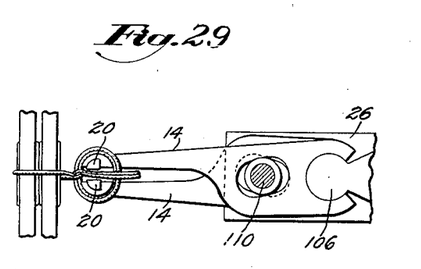
Figure 30:
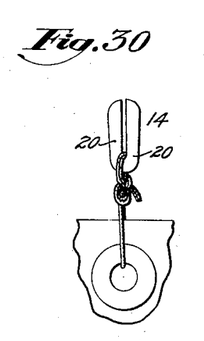
Figure 31:
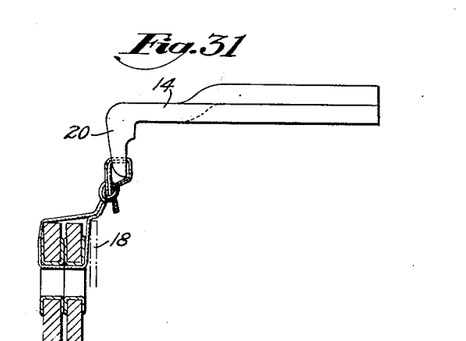
Figure 32:
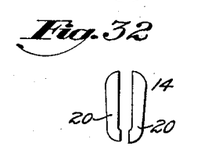
Figure 33:
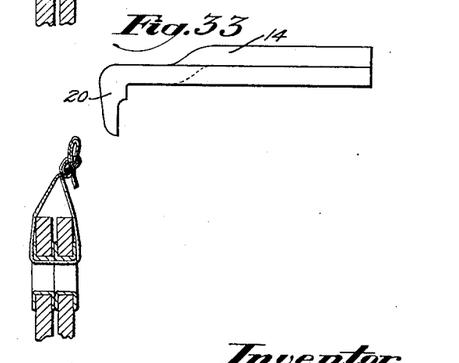

When the machine is at rest between lace inserting cycles the spindles with the ends of the cords projecting from their forward ends stand in the position indicated in Figs. 7, 15 and 17 so that the operator may readily pass the pairs of eyelets to be secured together over the spindles, with the upper edges of the quarters underlying the forwardly projecting fingers of the work holder 16. After the operator has placed the upper on the spindles the machine is started and the gripping jaws 4 and 6 move down into the position indicated in Fig. 15, seize the projecting ends of the cords and then move up into the position indicated in Fig. 20, while the spindles 2 withdraw from the eyelets, thus drawing sufficient cord through each spindle to form the corresponding lacing loop. The work holder also moves down to position the eyelets with relation to the knotting devices. As the spindles complete their rearward movement, the lower jaw 10 of the inner gripper moves upward into engagement with the upper jaw 8 to grip the cords between the inner side of the eyelets and the ends of the spindles and then the jaws continue upward into the position indicated in Fig. 21, during which movement the cord cutting knife 12 is operated to sever the cords. The outer jaws 6 and 4 meanwhile move downward so that the length of cord inside and outside the eyelets is equalized and brought together preparatory to the knotting. The knotters also move forward into the position to act on the cords. The measuring and stripping plate 18 accompanies the gripping jaw 10 in its upward movement from the position indicated in Fig. 20 into the position indicated in Fig. 21 and remains substantially at this height until it is again depressed at the end of the knotting operation in tightening the knot and stripping it from the knotter fingers. The knotters are then turned through a half revolution to bring their laterally projecting fingers 20 back of the two strands of cord leading from the opposite sides of eyelets to the inner and outer grippers and are then moved backward to draw the cords across the upper edge of the measuring plate 18, as indicated in Fig. 22, the inner and outer grippers moving downward to give up cord to accommodate this movement of the knotters. The knotters are then rotated through three-quarters of a revolution into the position indicated in Fig. 23 to form loops about the knotter fingers as indicated. The knotter fingers are then separated, as indicated in Figs. 28 and 29, and the inner and outer grippers move rearwardly to carry the ends of the cords between the fingers of the knotters, as indicated in Figs. 24, 28 and 29. The grippers then open to release the ends of the cords and the knotter fingers close to embrace the cord ends as indicated in Fig. 25. The knotters are then turned through a half revolution into the position indicated in Fig. 26, while the outer gripper moves outward and then down to engage the upper edge of the plate 18 so that the cords are gripped close to the knotters by the lower gripper jaw and stripper plate. The gripper jaws and plate then move downward into the position indicated in Fig. 27 so that the loops are stripped off of the knotter fingers, each of which draws a bight of the corresponding cord end through the loop formed on the fingers, thus completing and tightening the knot as indicated in Figs. 27, 30 and 31. The looper fingers are then again separated or opened so that the final downward movement of the outer gripper and stripper plate discharges the laced upper as indicated in Figs. 32 and 33. The parts are then returned to the positions indicated in Fig. 7 and the machine is stopped with the parts in this position, ready for another lace inserting cycle.

Figure 5:
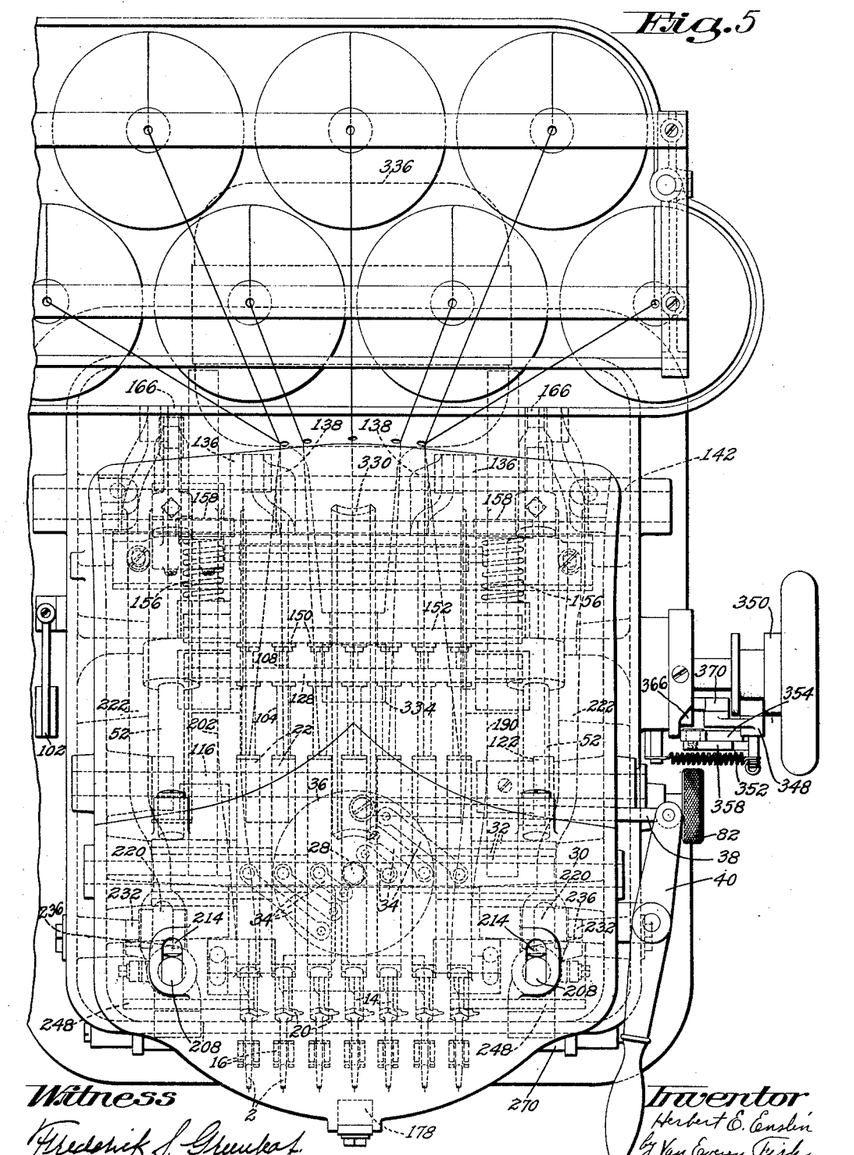
Fig. 5 is a plan view of the machine.
Figure 9:
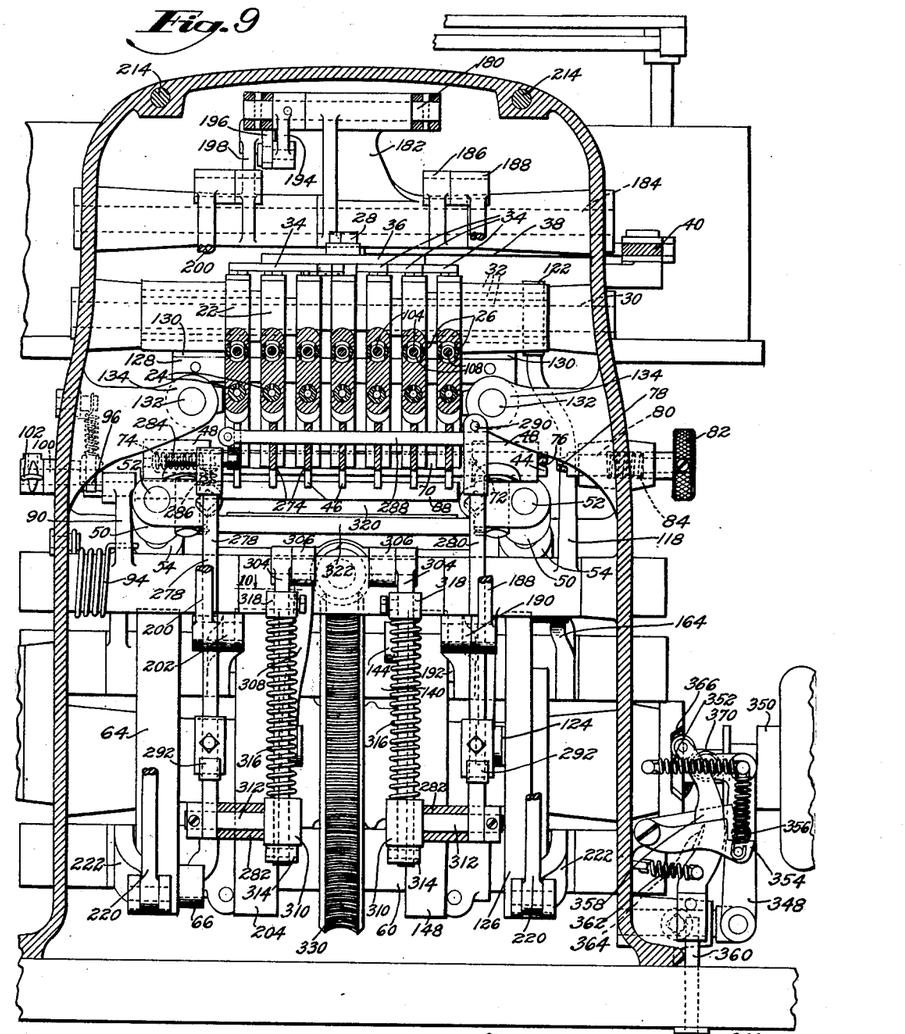
Fig. 9 is a sectional elevation on line 9, Fig. 7.
Figure 10:
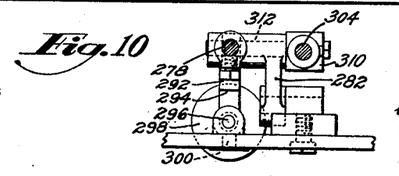
Fig. 10 is a detail showing a part of the mechanisms for measuring the lengths of the lacings.

The machine shown is designed to insert individual lacings in any number of pairs of eyelets up to seven and is accordingly provided with a gang of seven lace inserting units which are arranged side by side and are so mounted that they may be adjusted laterally with relation to each other to suit the spacing of the eyelets in the shoe upper in which the lacing are to be inserted. Each unit comprises a supporting block 22 (Figs. 16 and 17) in which is mounted a spindle carrier 24 and a knotter carrier 26. The center block is secured by a screw stud 28 to the transverse rod 30, the ends of which are secured in bearings in the machine casing. The three blocks on each side of the center block are formed on the inner ends of sleeves 32 which are nested to slide one within the other, the sleeves for the two inner blocks of each series of three sliding on the rod 30 and within the sleeves of the intermediate blocks which in turn slide within the sleeves of the outer blocks (Figs. 5 and 9). The blocks are adjusted to vary the spacing of the spindles by a series of links 34 connecting the blocks with a disk 36 mounted on the stud 28 of the center block and connected by a link 38 with an adjusting lever 40 arranged within convenient reach of the operator.

Figure 11:
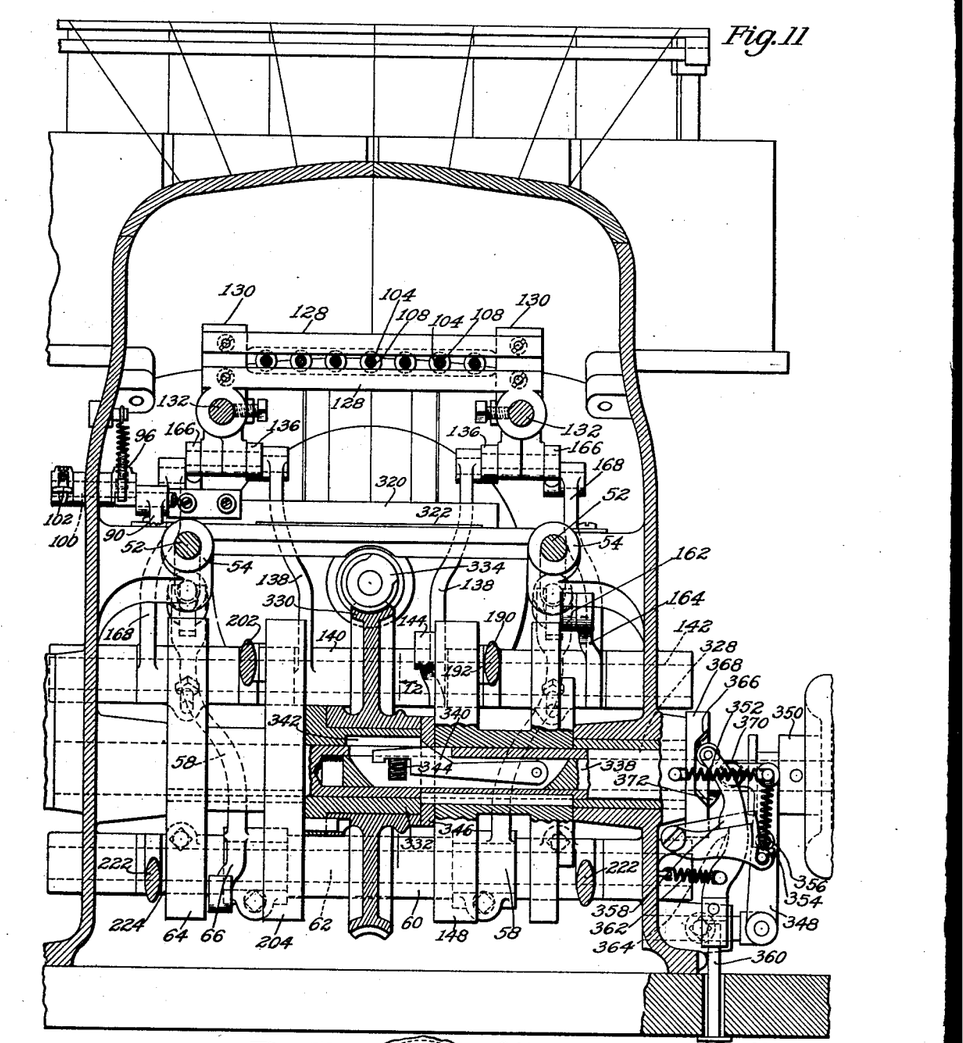
Fig. 11 is a sectional elevation on line 11, Fig. 7.
Figure 12:
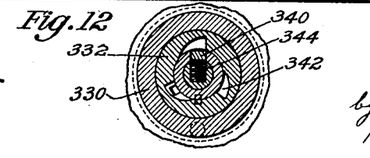
Fig. 12 is a sectional detail on line 12, Fig. 11.

Each spindle carrier 24 is in the form of a tube mounted to reciprocate in the corresponding block 22 and carrying at its front end a hollow spindle which may be conveniently screwed into the forward end of the carrier (Fig. 17). The tube is provided with a cord tensioning spring 42 which projects through a slot in the upper side of the tube and has its forward end arranged to bear against the bearing in which the tube slides so that the spring is pressed against the cord passing through the tube. The spring is so arranged, however, that when the spindle carrier is in its advanced position the end of the spring passes out of the bearing in the block, thus relieving the tension on the cord so that it may be drawn freely through the tube and spindle in threading the spindle. The tubes are retracted to withdraw the spindles from the eyelets and are subsequently returned to normal position by a transverse cylindrical bar 44 passing through plates 46 which are secured to the under side of the rear ends of the tubes and extend down through slots in the blocks 22. The ends of the bar are carried in bearing blocks 48 secured in collars 50 which are in turn secured to the forward ends of two rods 52 mounted to reciprocate in bearings 54 formed on the machine casing. Collars 56 are secured to the rear ends of the rods and are connected by pin and slot connections with the upper ends of arms 58 which are secured to a sleeve 60 mounted on a rock shaft 62 and oscillated to advance and retract the spindles by a cam formed in a disk 64 and engaged by a roll on an arm 66 which projects forward from the hub of the left hand arm 58 (Figs. 7 and 11).

Figures 18, 19:
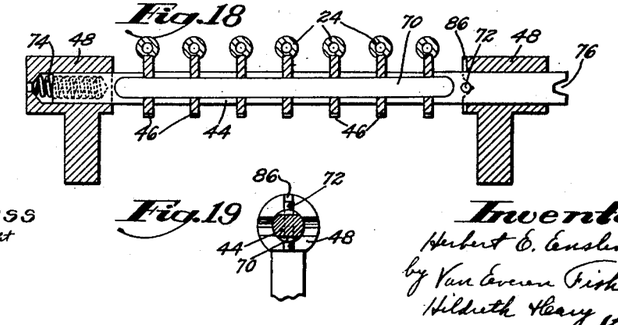
Fig. 18 is a sectional detail on line 18, Fig. 17.
Fig. 19 is a detail of the part shown in Fig. 18.

In order that any number of spindles may be rendered inactive when inserting lacings in less than the full number of eyelets for which the machine is designed, means is provided for readily disconnecting the spindle carriers from their actuating bar 44. Means is also provided which acts automatically under the control of the operator to return the inactive spindle carriers to active relation with the bar. To permit the spindle carriers to be disconnected from the bar the plates 46 are provided in front of the bar with open slots 68 which are somewhat less in width than the diameter of the bar and the bar is cut away at 70 on opposite sides to permit it to pass through the slots when given a quarter turn from its normal position indicated in Fig. 17 to the position indicated in Fig. 19. The bar is mounted to turn and move lengthwise in the bearing blocks 48 and is held in normal interlocking relation with the spindle carriers by projecting pins 72 held in the engagement with notchers in the right hand block 48 by a spring 74 which forces the bar yieldingly toward the right (Fig. 18). When the machine is at rest with the spindles in advanced position the notched end 76 of the bar is in position to be engaged by a lug 78 on the inner end of a shaft 80 which projects through the machine casing and is provided on its outer end with a knurled operating head 82. The shaft is held yieldingly in retracted position by the spring 84. If one or more of the spindles is to be rendered inactive the operator pushes in the shaft 80 to engage the lug 78 with the notched end of the bar 44 and gives the bar a quarter turn into the position indicated in Fig. 19 where the bar is held by the engagement of the pins 72 with the shallow notches 86. Any of the spindles may now be pushed back to disengage the corresponding plate 46 from the bar 44 as indicated in dotted lines in Fig. 17, after which the bar 44 may be returned to normal position where it is in inter-locking engagement with the plates of the spindle carriers which have not been thrust back. When the bar 44 is retracted to withdraw the spindles those spindles which have been disconnected will be moved back by engagement of the bar with the forward edges of the corresponding plates 46 into position where they will not interfere with the operation of the lace-inserting devices and the inactive spindles will remain in this abnormal retracted position until again re-connected with the bar 44.

When it is desired to render the inactive spindles again active the bar 44 is again turned into the position indicated in Fig. 19 and the inactive spindle carriers are first forced forward into engagement with the bar, after which the bar is returned to locking position. The means for re-engaging the spindle carriers with the bar consists of a transverse rod 88 arranged to engage the rear ends of the plates 46 and carried in the upper end of an arm 90 which is mounted to turn on a transverse shaft 92 and is forced forward by a spring 94 (Figs. 7 and 9). The rod is normally held in retracted position by a spring latch 96 provided with two shoulders 98, one or the other of which engages the projecting end of the rod when it is moved back by the rearward movement of the spindle carriers. The latch is secured upon a rock shaft 100 which projects through the machine casing and is provided with a lever 102 by which the operator may trip the latch to release the rod 88. When the rod is released it is moved forward by its spring to advance any spindle carriers which may be in abnormal retracted position into engagement with the spindle actuating bar 44. If all of the spindles are active the rod will be returned by the first rearward movement of the spindles into position to be engaged by the forward shoulder 98 of the latch 96. If, however, one or more of the spindle carriers is disconnected from the actuating bar when the spindles are retracted, the idle spindle carrier will push the rod 88 back until it is engaged and retained by engagement with the rear shoulder 98 of the latch.

Figure 16:
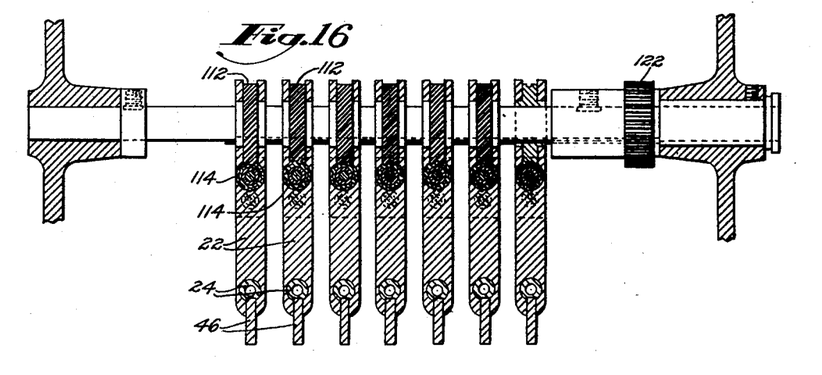
Fig. 16 is a sectional view on line 16 of Fig. 17.

Each knotter consists of two levers 14 provided at their forward ends with the laterally projecting knotter fingers 20 for engaging and forming the knot in the ends of the cords as heretofore described. Each pair of knotter levers is mounted in the slotted end of the corresponding knotter carrier 26 which is secured to a hollow shaft 104 mounted to turn and slide lengthwise in the corresponding block 22. The rear ends of the levers are recessed to engage and turn on a pivot lug 106 carried on the forward end of a rod 108 which passes through the shaft 104. The levers are provided with cam slots engaging a pin 110 in the knotter carrier so that the knotter fingers 20 may be opened and closed by forward and backward movement of the levers imparted thereto by the rod 108. The knotters are rotated through spiral gears 112 confined in recesses in the blocks 22 and engaging spiral pinions 114 also confined in recesses in the blocks 22 and connected with the shafts 104 by a key and slot connection, permitting endwise movement of the shafts through the pinions. The gears 112 are mounted on a transverse rock shaft 116 with which they are connected by a key and slot connection, permitting movement of the gears endwise of the shaft when the blocks 22 are adjusted to vary the spacing of the spindles. The shaft 116 is actuated through a lever 118, one arm of which is provided with a segment 120, engaging a gear 122 on the shaft, and the other arm of which carrier a cam roll 124 engaging a cam in the cam disk 126 (Figs. 7, 9 and 16).

The shafts 104 are advanced and retracted to advance and retract the knotters by transverse bars 128 spaced to receive the rear ends of the shafts which are provided with flanges engaging opposite sides of the bars. The ends of the bars are secured to collars 130 which are in turn secured to rods 132 mounted to reciprocate in bearings 134 on the machine casing (Figs. 7, 11 and 17). The collars are connected by links 136 with arms 138 formed on a sleeve 140 which is mounted to turn on a shaft 142 and is provided with a forwardly projecting arm 144 carrying a cam roll 146 which engages a cam groove in the cam disk 148.

The rear ends of the rods 108 are provided with collars 150 which are grooved to embrace the inner edges of two transverse bars 152, the ends of which are secured to collars 154 mounted on the rods 132 and pressed forward by springs 156 interposed between the collars and sleeves 158 pinned to the rods. The springs force the rods 108 and the knotter levers forward so that the knotter fingers are closed and so that the knotters move forward and back into the knotter carriers. The collars 154 are retracted to open the knotter fingers at proper points in the cycle of operations by a cam 160 arranged to engage a roll 162 on the forwardly projecting arm of a bell crank lever 164 which is secured to the shaft 142 and the vertical arm of which is connected by a link 166 with the right hand collar 154, while the left hand collar is connected by a similar link 166 with an arm 168 secured to the rock shaft.

The lower jaw 6 of the outer cord gripper is formed by the upper surface of a transverse bar secured to a plate 170 and the upper jaw 4 is formed by the lower edge of the slide 172 mounted in the plate and forced toward the lower jaw by springs 174 (Figs. 7 and 15). The slide is provided with a forwardly projecting finger 176 at its upper end arranged to engage a fixed stop 178 and thus open the gripper to receive the cord ends as the gripper is moved into the position indicated in Fig. 15. The gripper carrying plate 170 is provided at its upper end with rearwardly projecting ears which are pinned to the ends of a rock shaft 180 mounted in an arm 182 (Fig. 9). This arm is mounted on a transverse shaft 184 and is actuated to lower and raise the outer gripper through an arm 186 projecting from its hub and connected by a link 188 with the forward end of a cam lever 190 which is mounted on the shaft 142 and is provided with a roll 192 engaging a cam groove in the disk 148 (Figs. 7, 9, and 11). The shaft 180 is rocked in the arm 182 to swing the outer gripper inward or outward through an arm 194 secured to the shaft and connected by a link 196 with one arm of a bell crank lever 198 which is mounted on the shaft 184 and has its other arm connected by a link 200 with a cam lever 202 mounted on the shaft 142 and provided with a cam roll engaging the cam disk 204. When the outer gripper is swung inward, it engages and moves the inner gripper so that the grippers move inward together to carry the ends of the cords between the fingers of the knotters, as indicated in Fig. 24. This movement of the outer gripper also brings a pin 206 projecting from the rear face of the slide 172 into position to engage the upper edge of the bar which forms the upper jaw 8 of the inner gripper and temporarily arrest the downward movement of the slide so that the outer gripper is opened to release the cords by continued downward movement of the gripper carrying plate 170, as indicated in Fig. 25. At the same time the bar 10 of the inner gripper is depressed by its actuating mechanism to release the cord ends held thereby. After the cords have been released, the outer gripper swings outward accompanied by the inner gripper and plate 18 to the position of Fig. 21, the outward movement of the outer gripper continuing slightly to disengage the pin from the bar 8. The outer gripper then moves downward into the positions indicated in Figs. 26 and 27.

Figure 23:
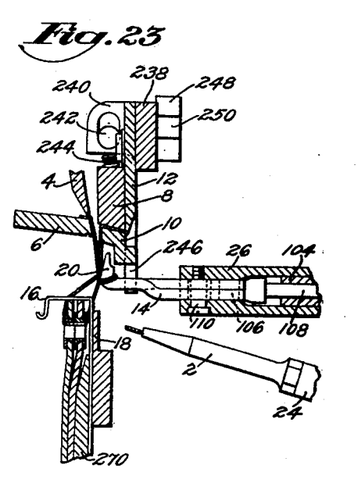
Figure 24:
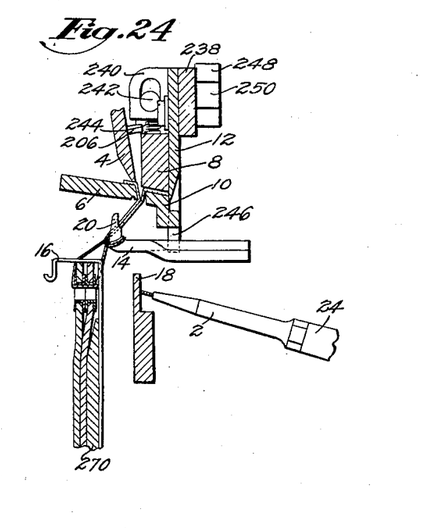

In order that the inner cord gripping jaws 8 and 10 may be moved inward by the inward swinging movement of the outer grippers from the position indicated in Fig. 23 to the position indicated in Fig. 24 the supports for the inner gripper jaws are mounted on two vertical rods 208, the lower ends of which are secured in brackets 210 pivotally supported upon studs 212 at opposite sides of the machine (Figs. 6, 7, 13 and 15). The rods are held in forward position by spring pressed pins 214 engaging the upper ends of the rods. The lower jaw 10 of the inner gripper is formed by the upper face of a transverse bar, the ends of which are secured in lugs 216 formed on sleeves 218 which are mounted to slide vertically on the rods 208. The sleeves are moved on the rods to raise and lower jaw of the inner gripper through links 220 connecting the sleeves with the forward ends of two arms 222 which are secured to the shaft 62 and the left hand one of which carries a cam roll 224 engaging a groove in the cam disk 64 (Fig. 11).

Figure 1:
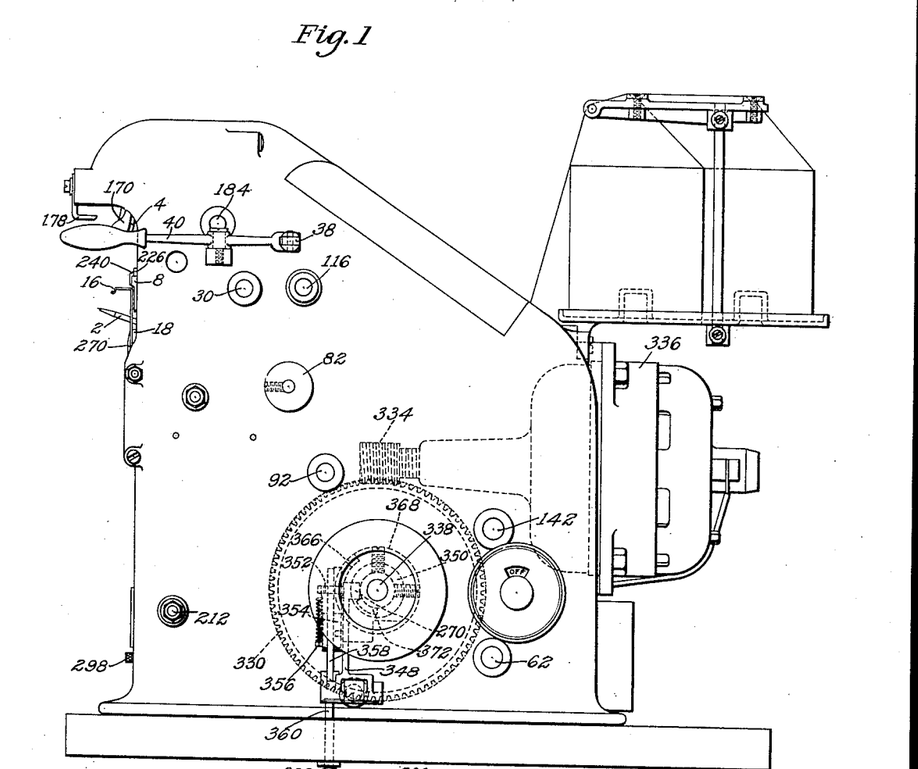
Figure 1 is a right hand side elevation of a machine embodying one form of the invention.
Figures 13, 14:
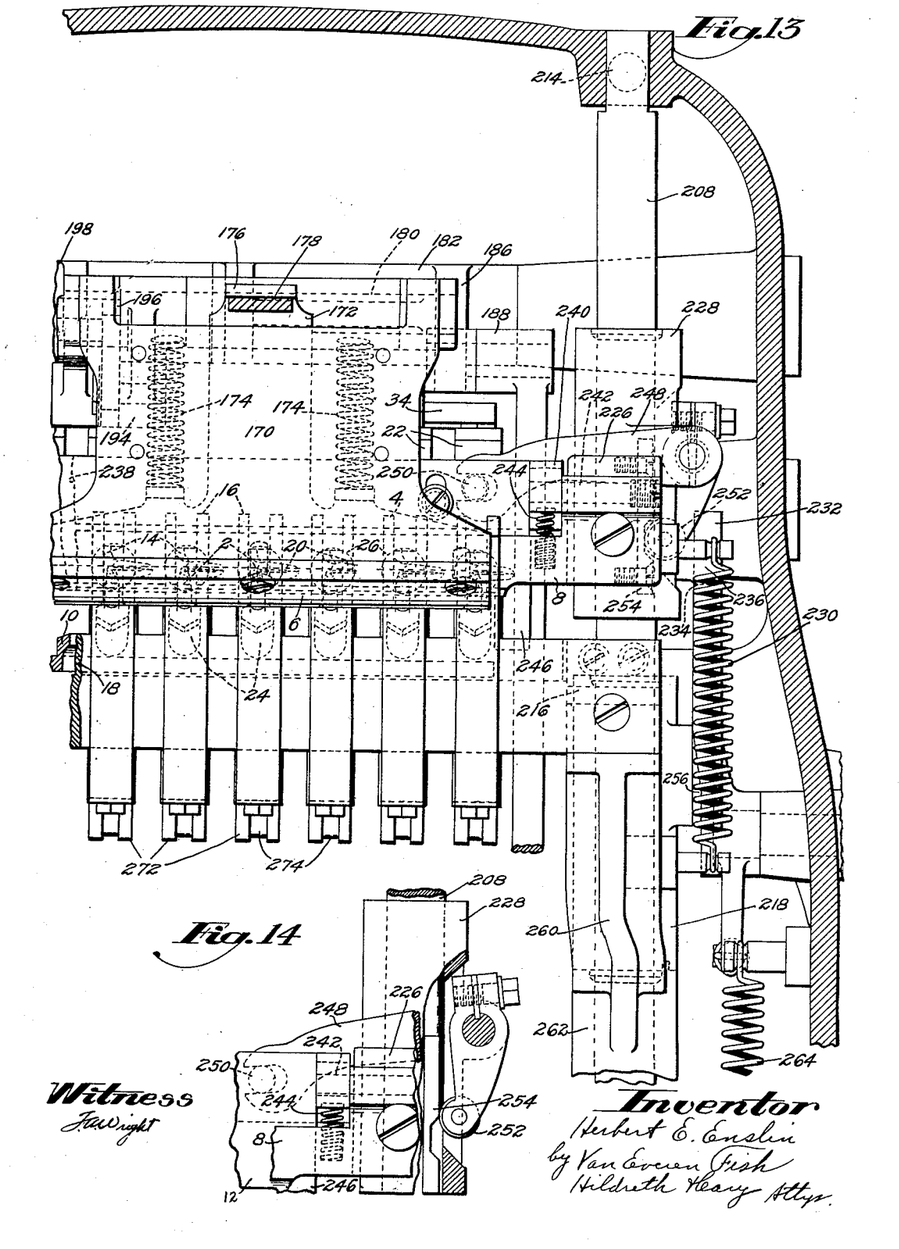
Fig. 13 is a partial front view with the work plate removed.
Fig. 14 is a detail showing a part of the cord cutter operating mechanism.

The upper jaw of the inner gripper is formed by the lower surface of a transverse bar 8, the ends of which are secured to lugs 226 formed on sleeves 228 mounted to slide vertically on the rods 208. The sleeves 228 are drawn downward toward the sleeves 218 by springs 230 connecting the sleeves and are normally supported to hold the upper jaw 8 in the position indicated in Fig. 20 by spring operated latch levers 232 provided with shoulders 234 arranged to underlie projecting lugs 236 on the sleeves 228. The cord cutting knife 12 is secured to the front face of a transverse knife bar 238 provided at its opposite ends with forwardly projecting ears 240 which are slotted to receive the ends of the guide pins 242 which project inward from the upward extensions at the ends of the bar 8. Springs 224 underlie the ends of the knife bar and hold it in raised position on the gripper bar 8. The cutter plate is provided at its ends with fingers 246 which extend down back of the lower gripper bar 10 and serve to guide the blade past the edge of the bar. When the lower gripper bar is moved upward it first carries the cords into engagement with the upper gripper bar 8 and then during its continued upward movement carries the upper gripper bar with it. As the upper gripper bar starts upward the cutter bar is operated to sever the cords through bell crank levers 248 mounted on the sleeves 228 and having their horizontal arms slotted to engage pins 250 on the back of the cutter bar and having their vertical arms provided with rolls 252 engaging cam plates 254 secured in the rods 208. When the upper gripper bar is in normal position, the cam rolls register with recesses in the cam plates, as indicated in Fig. 1. As the gripper bar starts upward, the cam rolls ride out of the recesses, thus rocking the levers 248 and depressing the cutter bar with relation to the gripper bar, as indicated in Figs. 14 and 21.

Figure 21:
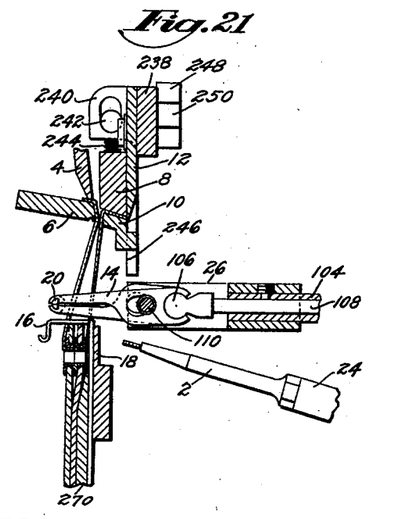
Figure 22:
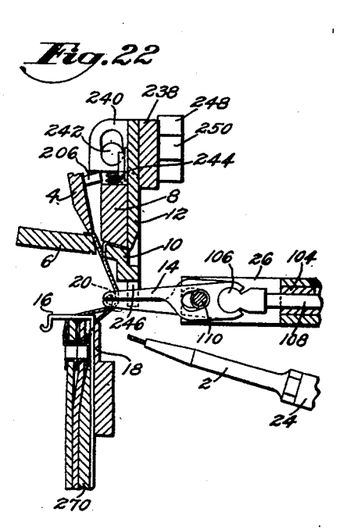

When the inner gripper moves upward into the position of Fig. 21, the latch levers 232 swing inward so that their upper end underlie the lugs 236 on the sleeves 228 and are in position to support the upper gripper bar 8 in the position indicated in Figs. 22 to 27 when the lower gripper bar moves downward into the position indicated in Figs. 25 to 27 to release the ends of the cords. The upper gripper bar remains in this position until the lower gripper bar returns to its lower position after the tying of the knots has been completed and the knotters have been returned to their retracted position. During this return movement of the lower gripper bar cams 256 on the sleeves 218 engage cam projections 258 on the latch levers and swing them back to release the lugs 236 and permit the sleeves 228 to descend until the lugs engage the shoulders 234 on the latches.

For convenience the supports for the measuring and stripping plate 18 are mounted on the rods 208. As shown, the ends of the plate are secured to arms 260 which project upward from sleeves 262 mounted to slide vertically on the rods 208. The sleeves are acted on by springs 264 which tend to raise the plate 18 into its upper position, which is determined by the engagement of the lower end of the slots 266 in the sleeves with stop screws 268 projecting from the rods 208. The plate is moved down below the path of the spindles by the engagement of the sleeves 218 with the sleeves 262 as the lower gripper bar 10 is moved down into its lower position. When the gripper bar moves up to grip the cords after the spindles have been withdrawn the plate 18 moves up with the bar until movement of the plate is arrested by the engagement of the lower ends of the slots in the sleeves 262 with the stop screws 268. When the upper gripper bar engages the edge of the plate the springs 264 yield to allow the plate to be moved downward with the gripper bar in tightening the knot and discharging the upper from the machine.

The work holder consists of a series of fingers 16 each provided at its upper end with a forward projection arranged to overlie and engage the edges of the upper quarters. The fingers are arranged to move vertically between the front side of the plate 18 and the rear side of a vertical front plate 270 and to thus determine the lengths of the lacings passing up from the eyelets over the upper edge of the plate 18 to the knotters. In doing certain classes of work the lower pair of eyelets of the shoe should be secured close together while the other pairs of eyelets should be so connected that the space between the edges of the quarters will be gradually increased when the shoe is lasted. In doing other classes of work all the pairs of eyelets should be so connected that they may be equally spaced apart when the shoe is lasted. The mechanism for operating the work holder is accordingly so constructed that the fingers may be moved down successively increasing distances from the edge of the plate 18 or may all be moved down the same distance, and means is also provided for adjustably varying the downward work positioning movement of the fingers.

Figure 6:
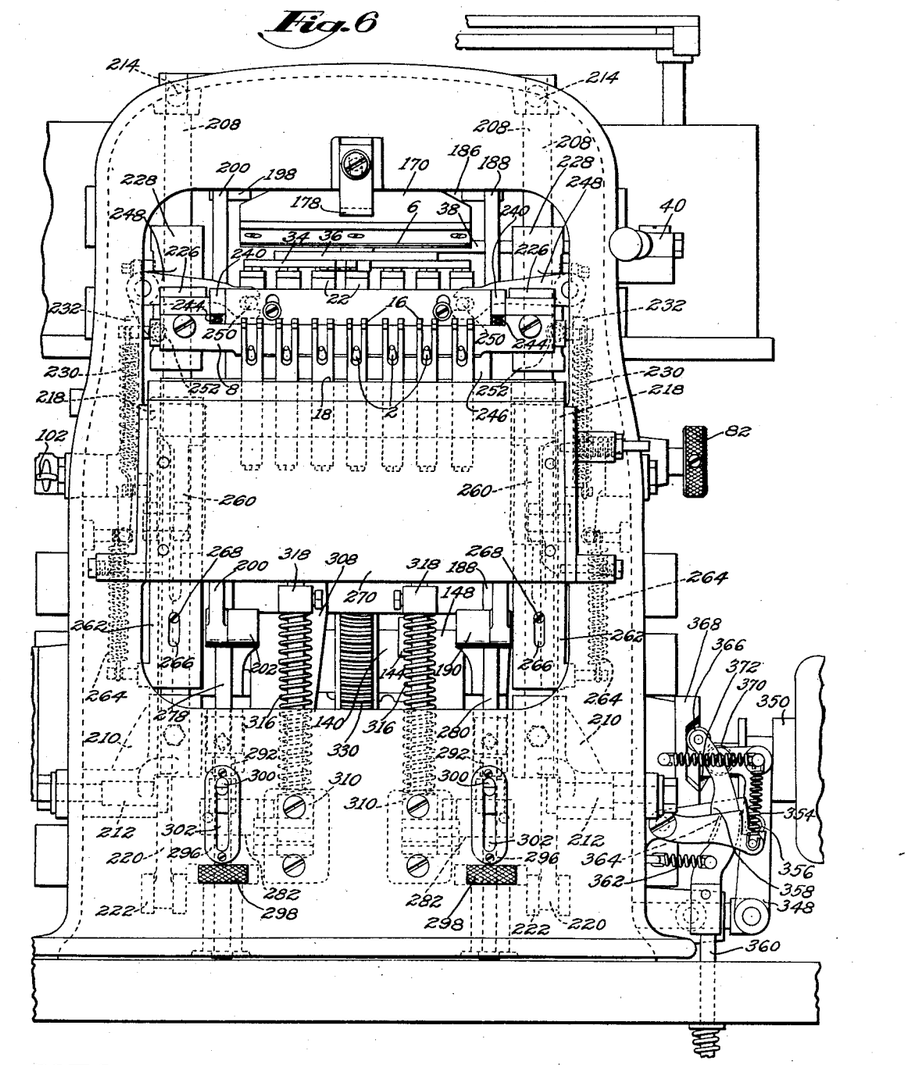
Fig. 6 is a front elevation of the machine.
Figure 8:
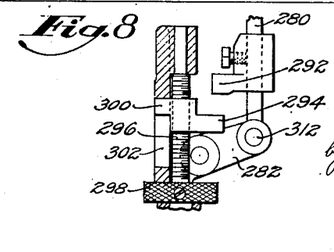
Fig. 8 is a detail showing a part of the mechanism for determining the lengths of the lacings.

As shown in Fig. 17, the lower end of each finger is secured to a block 272 which is vertically slotted at its rear edge to embrace the forward end of a lever 274, the rear end of which is pivoted between lugs on the lower side of a block 22. The block 272 is connected with the lever 274 by a screw pin 276 passing through a slot in the lever. The means for operating the levers to lower and raise the work holder fingers comprises two vertically movable links 278 and 280, the lower ends of which are pivoted to the rear ends of arms 282 which are in turn pivoted to lugs on the machine casing. The upper end of the link 278 is slotted to embrace a pin 284 projecting from the left hand lever 274 and a spring 286 is arranged in the slot to underlie the pin and hold it in engagement with the upper end of the slot. The upper end of the link 280 is slotted to embrace the end of a transverse rod 288 which extends through holes in the levers 274 and has its left hand end pivoted to a bracket secured to the left hand lever (Figs. 7 and 9). The lower end of the slot in the link 280 is crowned to permit angular as well as sliding movement of the rod 288 and the rod is held in engagement with the end of the slot by a cross pin 290. Each link 278 and 280 is provided with a stop lug 292 arranged to engage a stop 294 adjustably mounted on the machine casing to determine the downward movement of the corresponding link. The stops 294 are mounted on adjusting screws 296 which are provided with knurled collars 298 by which the operator may adjust the stops, and each stop is provided with a projection 300 extending into a slot 302 in the front of the machine casing and indicating the adjustment of the corresponding stop (Figs. 6 and 8). The margins of the slots may be provided with scales for indicating the proper adjustments for different lengths of lacings. The arms 282 are oscillated to lower and raise the work holder fingers through links 304, the upper ends of which are pivoted to the forward end of arms 306 projecting from a sleeve mounted on the shaft 92 and provided with an arm 308 carrying a roll engaging a groove in the cam disk 204, (Figs. 7 and 9). The lower ends of the links pass through pivot blocks 310 formed on the ends of the pivots 312 which connect the links 278 and 280 with the arms 282. The lower ends of the links are provided with collars 314 which are normally held in engagement with the under sides of the pivot blocks by springs 316 interposed between the upper sides of the blocks and collars 318 secured to the links.

Through the above connections the links 278 and 280 are moved downward until the corresponding stop lug 292 engages the stop 294, after which the springs 316 will yield during the continued movement of the rock arms 306. If the stops 294 are similarly adjusted then both links 278 and 280 will be moved down the same distance and consequently below the edge of the plate 18 and the knotters so that the lacings will be of equal length and will be of a length dependent upon the adjustment of the stops. If the left hand stop is adjusted to its highest point then the left hand pair of eyelets, i. e., the bottom eyelets of the shoe, will be tied close together since the upper end of the left hand work finger will move the edge of the work practically into line with the upper edge of the plate 18, as indicated in the diagrammatic views 21 to 26. When the left hand stop is thus adjusted the right hand stop is adjusted to a lower position so that the successive work holder fingers, and therefore the successive pairs of eyelets, will be located at progressively increasing distances from the upper edge of the plate 18 and the corresponding knotters, and thus the lacings connecting the successive pairs of eyelets will be of increasing length to permit the space between the edges of the upper to gradually increase from the lower eyelets upward when the shoe is lasted. When the work holder fingers are thus located to secure a progressive increase in the lengths of the lacings one or more fingers at the left will be engaged by the outer gripper during the tightening of the knot and discharge of the upper and the spring 286 will yield to permit these fingers to be depressed by the outer gripper as it moves from the position in Fig. 26 to that of the position in Fig. 27. In doing the different classes of work the work positioning fingers at the right will always move down to a position where they will not be engaged by the cord gripper as it moves into the position of Fig. 27 and the right hand end of the bar 288 need not, therefore, be yieldingly supported.

In order that the cords may be held taut while the cutter is severing the lengths of cord drawn through the spindles, means is provided for gripping the cords between the cord supply and the cutter during the cutting. This means comprises a gripper bar 320 under which the cords lead on their way from the cord supply to the rear ends of the spindle carriers and by which they are held against the upper side of a transversely grooved stationary bar 322. The bar 320 is secured in the front end of a lever 324, the rear end of which is arranged to be engaged by a cam lug 326 secured to the left hand rod 52. When the rods 52 are retracted to withdraw the spindles into their retracted position the lug 326 rides against the rear end of the lever 324 and forces the clamping bar 320 firmly against the bar 322, thus clamping the cords so that they are held taut between this bar and the upper gripper jaws when acted upon by the inner gripper and cutter. The proper gripping and severing of the cords is thus insured.

Figures 2, 3:
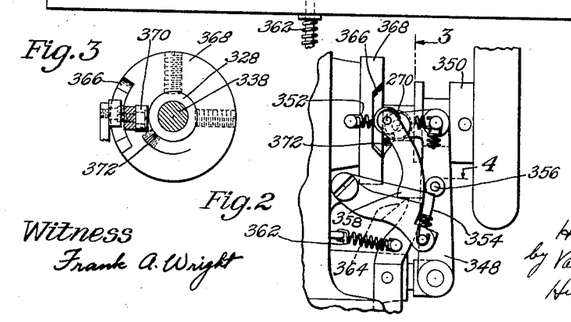
Fig. 2 is a detail of the starting and stopping mechanism.
Fig. 3 is a sectional view on line 3, Fig. 2.
Figure 4:
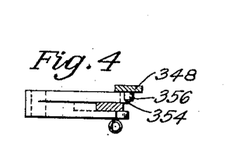
Fig. 4 is a sectional view on line 4, Fig. 2.

The various cams of the machine are secured upon a cam shaft 328 which is driven through a single revolution for each cycle of the machine. The driving mechanism comprises a worm wheel 330 secured to a clutch sleeve 332 and driven through a worm 334 from an electric motor 336. The clutch sleeve 332 is loosely mounted on the cam shaft which is bored to receive a clutch operating rod 338. The rod carries a pivoted clutch dog 340 arranged to project through a slot in the shaft and to engage one of three recesses 342 formed in the interior of the clutch sleeve 332. A spring 344 tends to move the clutch dog outward into engagement with the clutch sleeve and the dog is withdrawn into inactive position by the engagement of an incline on its outer edge with the collar 346 on the shaft. The one revolution stop motion for controlling the clutch comprises a lever 348, the upper end of which is provided with a roll engaging an annular groove in a collar 350 secured to the clutch rod 338 and acted upon by a spring 352 tending to shift the rod into clutch engaging position. The lever is held in clutch disengaging position by a spring operated latch 354 engaging a pin 356 on the lever. The latch is disengaged by a hook 358 carried on the upper end of a treadle operated starting rod 360 and held by a spring 362 in engagement with a shoulder 364 on the latch. The upper end of the hook is provided with a roll normally lying within a recess 366 in a cam disk 368 secured to the cam shaft. The upper end of the clutch shifting lever 348 carries a roll 370 arranged to be engaged by a cam 372 on the face of the disk 368. When the machine is to be started the treadle is depressed, thus drawing the latch 354 down into the position indicated in Fig. 2 so that the clutch lever may move to the left, carrying the pin 356 over the upper edge of the latch and engaging the clutch. As the cam shaft starts to revolve the roll on the end of the hook 358 is forced out of the recess in the cam disk 368, thus disengaging the hook from the latch so that the latch is free to return so far as the hook is concerned, regardless of whether the operator removes his foot from the treadle or not. The cam shaft now makes a single revolution and as it completes the revolution the cam 372 moves the clutch shifting lever 348 back to normal position and immediately the latch re-engages the pin 356 and retains the lever in clutch-disengaging position. As the shaft completes its revolution the recess 366 comes into registry with the roll on the end of the hook 358 so that the hook may re-engage the latch if or when the treadle is released.

I claim:

1. The method of lacing shoe uppers preparatory to lasting which consists in passing a separate cord through each pair of eyelets relatively manipulating the cords and upper to cause the cords to vary in length and tying the ends of the cords together to form lacing loops of different lengths.

2. The method of lacing shoe uppers preparatory to lasting which consists in passing a series of cords through a series of pairs of eyelets, severing from the cord supplies lengths of cord which vary from one end of the series to the other, and tying together the ends of the lengths of cord to form a series of lacing loops of progressively varying lengths.

3. The method of lacing shoe uppers preparatory to lasting which consists in simultaneously passing a series of cords through a series of pairs of eyelets, relatively manipulating the cords and upper to cause the cords to vary in length and thereafter tying the cords to form a series of separate lacings of varying lengths in the series of pairs of eyelets.

4. The method of lacing shoe uppers preparatory to lasting which consists in passing a separate cord through each pair of eyelets, bringing the ends of each cord together, and tying the ends of each cord together at different distances from the shoe upper to form lacing loops of different lengths.

5. The method of lacing shoe uppers preparatory to lasting which consists in passing a series of cords through a series of pairs of eyelets, relatively manipulating the cords and upper to cause the cords to vary in length progressively from one end of the series to the other, and tying together the ends of the cords to form a series of lacing loops of progressively varying lengths.

In testimony whereof I have signed my name to this specification.

HERBERT E. ENSLIN.